United States Patent [19]

Kawaki et al.

[11] Patent Number: 5,051,309

[45] Date of Patent: Sep. 24, 1991

[54] ANTI-DAZZLING POLYCARBONATE POLARIZING PLATE

[75] Inventors: Takao Kawaki; Ryozo Kawai; Katsushige Hayashi; Masaki Nagata, all of Tokyo, Japan

[73] Assignee: Mitsubishi Gas Chemical Co., Inc., Tokyo, Japan

[21] Appl. No.: 512,182

[22] Filed: Apr. 20, 1990

[30] Foreign Application Priority Data

Apr. 27, 1989 [JP] Japan ................................. 1-105853

[51] Int. Cl.$^5$ ...................... B32B 27/36; G02B 27/28; G02B 5/30
[52] U.S. Cl. .................................... 428/332; 428/412; 428/522; 428/913; 359/490; 359/350
[58] Field of Search ................ 428/412, 522, 332, 913

[56] References Cited

U.S. PATENT DOCUMENTS 4,363,840 12/1982 Roullet et al. ...................... 428/412
4,698,374 10/1987 Gallas ............................. 428/412 X

FOREIGN PATENT DOCUMENTS 0228611 12/1986 European Pat. Off. .
0297841 6/1988 European Pat. Off. .
0299509 7/1988 European Pat. Off. .

Primary Examiner—P. C. Sluby
Attorney, Agent, or Firm—Sherman and Shalloway

[57] ABSTRACT

An anti-dazzling polycarbonate polarizing plate is formed with a polarizing thin layer composed of a polymeric film having a dichroic substance adsorbed on and oriented in the polymeric film, and a polycarbonate sheet having a retardation value of at least 2000 nm bonded to one or both surfaces of the polarizing thin layer.

7 Claims, No Drawings

ANTI-DAZZLING POLYCARBONATE POLARIZING PLATE

This invention relates to a polarizing plate having a protective layer composed of a sheet or film of a polycarbonate which has excellent impact strength and thermal resistance and does not form a colored interference fringe to white light. Because of the above excellent properties, the polarizing plate of this invention can be advantageously used for anti-dazzling purposes such as, for example, sunglasses, goggles, a window blind and a sunvisor for automobiles.

It is well known that a polarizing plate of a sheet or a film has excellent performance as an anti-dazzling material, and it has been well used as sunglasses or goggles. A polarizing plate of a sheet having a polarizing function is usually of a structure in which surface protective layers of conventional polarizing plates are composed of cellulosic sheets such as triacetyl cellulose sheets, acrylic sheets or polyester sheets. Polycarbonate sheets have not yet gained commercial acceptance as surface protective layers of polarizing plates despite the fact that they are very much expected to be used as surface protective layers because of their excellent impact strength and thermal resistance.

One reason is that the colored interference fringe in a polycarbonate sheet, which does not matter under usual light, tends to occur under polarizing light as compared with another resin sheet.

Since birefringence characteristics are more difficult to control in polycarbonate sheets than in other resin sheets, this difficulty further precludes utilization as a protective layer of a polarizing plate.

Occurrence of a colored interference fringe degrades a merchandize value. Moreover, when sunglasses comprising a lens made of a polarizing plate having a surface protective layer which is prone to a colored interference fringe are worn for a long period of time, the eyes undergo fatigue, and in an extreme case, become a cause of headache. This is not good for health. Particularly, when a polarizing plate is to be processed in a curved surface in the production of lenses for sunglasses, the occurrence of a colored interference fringe is much facilitated, and the resulting lenses cannot be satisfactorily used for sunglasses and goggles.

Some of the present inventors studied the development of lenses for sunglasses and goggles having little optical distortion, good anti-dazzling effects and excellent thermal resistance and impact strength, and consequently found a method of producing a polarizing polycarbonate lens. This method comprises laminating polycarbonate films or sheets on both side of a polarizing thin layer composed of a polymeric film and a dichroic dye oriented on the polymeric film to produce a polarizing plate having a thickness of 0.5 to 2.5 mm gradually deforming the polarizing plate with a pressure of not more than 1.2 kg/cm$^2$ at a temperature of at least 135° C. and up to a temperature at least 30° C. higher than the glass transition temperature of the polycarbonate of the polarizing plate before the polarizing plate attains the glass transition temperature of the polycarbonate, thereby to mold the curved polarizing plate to a radius of curvature of at least 80 mm (see Japanese Laid-Open Patent Publication No. 22538/89).

This process is considerably improved in optical distortion and anti-dazzling effect over the conventional lens having a prior polycarbonate protective layer. However when it is actually used as a lens, it has been found that a slight colored interference fringe is observed, and a further improvement is desired.

Specifically, the colored interference fringe is difficult to remove completely by the above-cited Publication in which the polycarbonate sheet polarizing plate is deformed at a fixed temperature under a fixed pressure. When the lenses obtained in Examples 1 and 2 of the above method were evaluated by the test of colored interference fringe described below, it was found that they were at best in rank C.

The present inventors furthered their investigations to develop a polycarbonate polarizing plate having a further reduced occurrence of colored interference fringe and high practical applicability as compared with the above method. As a result, they found that the retardation value of the polycarbonate sheet itself has closely to do with the occurrence of a colored interference fringe, and by using a polycarbonate sheet having a retardation value above a certain limit, the above object is achieved.

According to the invention, there is provided a polycarbonate polarizing plate for anti-dazzling purposes comprising a polarizing thin layer composed of a polymeric film having a dichroic substance adsorbed on and oriented in the polymeric film, and a polycarbonate sheet having a retardation value of at least 2000 nm bonded to one or both surfaces of the polarizing thin layer.

By using a polycarbonate sheet having the above retardation value, a colored interference fringe does not at all occur in the polycarbonate polarizing plate of this invention, or occurs only to such a slight degree that does not matter in practical applications, and it has excellent impact strength and thermal resistance.

In the present invention, the retardation value (R nm) is defined by the following equation.

$$\text{Retardation value (R)} = \Delta n \times d$$

wherein $\Delta n$ is the birefringence of the polycarbonate sheet, and d is the thickness (nm) of the sheet.

By using a polycarbonate sheet having a retardation value (R) of at least 2000 nm, preferably at least 30000 nm, as a protective layer, a polycarbonate polarizing plate for anti-dazzling purposes can be obtained irrespective of the thickness of the polycarbonate sheet and a method of forming a curved surface. The retardation value (R) of the polycarbonate sheet used in this invention is at least 2,000 nm, preferably at least 2,500 nm, especially preferably at least 3,000 nm. There is no particular upper limit, and generally, the upper limit is not more than 20,000 nm. If a polycarbonate sheet having an R value of less than 2,000 nm is used, a colored interference fringe tends to occur in the polarizing plate, and this tendency gradually becomes stronger as the R value further decreases.

The polycarbonate sheet used in this invention is a polycarbonate derived from 4',4'-dihydroxy-diphenyl-2,2-propane (bisphenol A) as a main component (in an amount of preferably at least 80 mole %, particularly 90 mole %).

The polycarbonate sheet having the above retardation value in this invention can be produced by forming a sheet from the above sheet-forming polycarbonate by an ordinary extrusion method or casting method, and stretching the sheet substantially in one direction while heating it at a temperature slightly higher than its glass transition temperature (for example, about 140° C. to about 180° C.). The thickness of the sheet and its stretch ratio affect the retardation value (R).

If the thickness of the polycarbonate sheet before stretching is 0.4 to 1.0 mm, the stretch ratio of the sheet is 1.2 to 2.0 times. If the thickness of the sheet is as thin as not more than 100 micrometers before stretching, the stretch ratio is 3 to 4 times. If the thickness of the sheet is 1 mm or above before stretching, the stretch ratio is 1.1 to 1.5 times. There is no particular limit to the thickness of the polycarbonate sheet. From the standpoint of operability, the suitable thickness is about 30 micrometers to about 40 mm, preferably about 50 micrometers to about 3 mm.

The polycarbonate sheet may be a sheet produced from an ordinary polycarbonate resin or a polycarbonate copolymer resin. The polycarbonate sheet used in this invention may have its surface coated with a hard coating, or treated to improve an anti-haze property or coloration. The polycarbonate sheet described above is bonded to one or both surface of the polarizing thin layer. Generally, it is preferably bonded to both surfaces.

A polyvinyl alcohol-type film is suitable as the polymeric film that is used as a base of the polarizing thin layer. Specific examples are a polyvinyl alcohol film, a polyvinylformal film, a polyvinylacetal film and a saponified (ethylene/vinyl acetate) copolymer film. The polyvinyl alcohol film is especially preferred.

Examples of the dichroic substances (particularly dichroic dye) used to impart polarizing property to the polymeric film include Chlorantine Fast Red (C. I. 28160), Chrysophenine (C. I. 24895), Sirius Yellow (C. I. 29000), Benzopurpurine (C. I. 23500), Direct Fast Red (C. I. 23630), Brilliant Blue 6B (C. I. 24410), Chlorazol Black BH (C. I. 22590), Direct Blue 2B (C. I. 22610), Direct Sky Blue (C. I. 24400), Diamine Green (C. I. 30295), Congo Red (C. I. 22120), and Acid Black (C. I. 20470).

Adsorption of these dichroic substances or iodine on the polymeric film, and orienting them can be carried out, for example, by the following method.

The polymeric film (particularly a polyvinyl alcohol film) is immersed in an aqueous solution of the dichroic substance at room temperature to 50° C. to adsorb the dichroic substance on the film. Then, the film is stretched at room temperature to 80° C. to 2.5 to 8 times in one direction in water in which an additive such as a metal ion or boric acid is dissolved to thereby effect the adsorption and orientation.

There is no particular limitation on the thickness of the polarizing thin layer used in this invention. From the standpoint of the starting film and operability, the thickness of the film is usually about 20 to about 120 micrometers, especially preferably 30 to 50 micrometers. The bonding of the polycarbonate sheet to the polarizing thin layer is effected by using a highly transparent adhesive, for example, an ordinary adhesive of the acrylic type, epoxy type or urethane type.

The polycarbonate polarizing plate has the inherent properties of the polycarbonate sheet not seen in another polycarbonate-type polarizing plate in thermal resistance and impact strength. The problem of the occurrence of a colored interference fringe is eliminated. By its light polarizing ability, glitterings of reflected light, etc. can be shut off. Accordingly, the product has a high merchandize value, and is very good for the health of the eyes. It is suitably used as goggles, sunglasses, windshields of autocycles, windshields of helmets, shields, blinds, automobile windows, and sunvisors for anti-dazzling.

The following Examples and Comparative Examples illustrate the present invention more specifically.

In these examples, the following methods of measurement are used.

(1) The transmittance was measured by using a spectrophotometer (made by Hitachi Limited; tradename HITACHI 330).

(2) The single plate transmittance, the parallel position transmittance ($H_0$, the light transmittance of a structure obtained by superimposing two polycarbonate polarizing plates so that the molecular orientation of the polarizing thin layers were said parallel to each other) the right angle position transmittance ($H_{90}$, the light transmittance of a structure obtained by superimposing two polycarbonate polarizing plates so that the molecular orientation axes of the polarizing thin layers crossed each other at right angles) were average values obtained after correcting the visual sensitivity in a visible region at 400 to 700 nm.

The degree of polarization was as follows.

$$\text{Degree of polarization (\%)} = \sqrt{\frac{H_0 - H_{90}}{H_0 + H_{90}}} \times 100$$

(3) The retardation value of the polycarbonate sheet was measured by a polarizing microscope (made by Orc-Seisakusho: TEM-120AFT).

(4) The colored interference fringe was observed and evaluated by interposing a test sample between two polarizing sheets, and observing it with naked eyes.

The results were assigned to the following four ranks.
A: Hardly any colored interference fringe was noted.
B: A very slightly colored interference fringe was noted. This causes no problem in practice.
C: A lightly colored interference fringe was noted.
D: A marked interference fringe was noted.

For use as sunglasses, the occurence of a colored interference fringe is desirably in rank B or A.

EXAMPLE 1

Polyvinyl alcohol (kuraray Vinylon #7500 produced by Kuraray Inc.) was dyed at 40° C. for 15 minutes in an aqueous solution containing 0.40 g/liter of Chlorantine Fast Red, 0.30 g/liter of Brilliant Blue 6B and 0.30 g/liter of Chrysophenine.

The dyed film was immersed for 10 minutes at room temperature in an aqueous solution containing 0.3 g/liter of nickel acetate tetrahydrate and 12.2 g/liter of boric acid at room temperature for 10 minutes, and monoaxially stretched in the same solution to 4 times its original size It was then taken out from the solution, and while it was maintained under tension, it was washed with water and dried, then heat-treated at 110° C. for 10 minutes to obtain a polarizing film. Polycarbonate sheets having a thickness of 0.7 mm and a retardation value of 4410 nm were laminated by using a polyurethane adhesive onto both sides of the polarizing film so that the orientation directions of the sheets agreed with each other. Thus, there was obtained a polarizing plate having a single plate transmittance of 19.8 % and a degree of polarization 99.9 %.

The polarizing plate was heated in an atmosphere kept at 140° C. and as soon as the heating was started, it was sucked to 3 mmHg over the course of 0.5 minute.

Then, it was vacuum-formed for 5 minutes to a lens having a radius of curvature of 90 mm. When the resulting lens was disposed in any manner between two polarizing plates, a colored interference fringe which was troublesome under white light was not observed. The result of observation was therefore in rank A.

EXAMPLE 2

A polyvinyl alcohol film (kuraray Vinylon #7500 produced by Kuraray Inc.) was stretched monoaxially to 4 times its original size in an aqueous solution containing 0.03 % of iodine, 0.43 % of potassium iodide and 0.71 % of boric acid, and then dried. Polycarbonate sheets having a thickness of 0.4 mm and a retardation value of 3290 nm were laminated by a polyurethane adhesive onto both surfaces of the polarizing layer obtained above so that their directions of orientation agreed with each other to obtain a polarizing plate having a single plate transmittance of 38.8 % and a degree of polarization of 99.9%.

The polarizing plate was formed into the shape of a frame of a goggles for skiing, and a goggles having a radius of curvature 90 mm was produced. A colored interference fringe on this goggles was evaluated as in rank A.

EXAMPLE 3

Polycarbonate sheets having a thickness of 1.0 mm and a retardation value of 5520 nm were laminated by a polyurethane adhesive onto both surfaces of the same polarizing film as used in Example 1 so that the orientation axis of the polarizing film was at right angles to those of the polycarbonate sheets. A polarizing plate having a single plate transmittance of 19.6% and a degree of polarization of 99.9 % was obtained.

The polarizing plate was placed in a cylindrical mold at 150° C. and maintained for 5 minutes. Thereafter, the mold was clamped at a rate of 5 mm/min., and the laminate was molded under a pressure of 10 kg/cm$^2$ to form a curved surface plate having a radius of curvature of 110 mm.

A colored interference fringe of this curved surface plate was evaluated as belonging to rank A as in Example 1 or 2.

EXAMPLE 4

A lens was prepared in the same way as in Example 1 except that polycarbonate sheets having a retardation value of 2130 nm and a thickness of 0.7 mm were used.

When the resulting lens was placed between two polarizing plates, an interference fringe was observed depending upon the angle of placing. But the interference fringe was not marked. When a highly reflective light was viewed through this lens, a troublesome interference fringe was not observed. It was determined that this interference fringe belonged to rank B.

COMPARATIVE EXAMPLE 1

Example 1 was repeated using the following three commercial polycarbonate sheets.
a) A polycarbonate sheet having a thickness of 1.0 mm and a retardation value of 496 nm.
b) A polycarbonate sheet having a thickness of 1.0 mm and a retardation value of 1140 nm.
c) A polycarbonate sheet having a thickness of 0.7 mm and a retardation value of 542 nm.

In any case, a marked colored interference fringe evaluated as rank C was observed.

COMPARATIVE EXAMPLE 2

Example 3 was repeated except that a polycarbonate sheet having a thickness of 1.0 mm and a retardation value of 1920 nm was used. When the resulting curved surface plate was interposed between two polarizing plates, a colored interference fringe evaluated as rank C was clearly observed.

We claim:
1. An anti-dazzling polycarbonate polarizing plate comprising a polarizing layer having a thickness of from about 20 to about 120 micrometers comprising a polyvinyl alcohol-type film having a dichroic substance adsorbed on and oriented in the polyvinyl alcohol-type film, and a polycarbonate sheet having a retardation value of at least 2000 nm bonded to one or both surfaces of the polarizing layer.

2. The polarizing plate of claim 1 in which the polycarbonate sheet has a retardation value of at least 3000 nm.

3. The polarizing plate of claim 1 or 2 in which the polycarbonate sheet has a thickness of about 30 micrometers to about 4 mm.

4. The polarizing plate of any one of claims 1 to 3 in which the polycarbonate sheet is bonded to both surfaces of the polarizing thin layer.

5. The polarizing plate of claim 1 wherein the polycarbonate sheet comprises 4,4-dihydroxy-diphenyl-2,2-propane as a main component.

6. The polarizing plate according to claim 5 wherein 4,4-dihydroxy-diphenyl-2,2-propane comprises 90 mole % of the polycarbonate sheet.

7. The polarizing plate of claim 1 wherein the polycarbonate sheet has a surface coating capable of imparting an anti-haze property to the polymerizing sheet.

* * * * *